United States Patent

Offerhaus

Patent Number: 5,582,547
Date of Patent: Dec. 10, 1996

[54] COUPLING SHAFT HAVING A PROTECTIVE COVER WITH A LOCKING MEMBER

[75] Inventor: David W. L. Offerhaus, Nijmegen, Netherlands

[73] Assignee: Agritrans B.V., Wijchen, Netherlands

[21] Appl. No.: 197,200

[22] Filed: Feb. 16, 1994

[30] Foreign Application Priority Data

Feb. 17, 1993 [NL] Netherlands .................... 9300304

[51] Int. Cl.⁶ .................. F16C 1/26; F16D 3/84
[52] U.S. Cl. ........................... 464/172; 403/316
[58] Field of Search ....................... 464/172, 170, 464/173, 7; 403/353, 315, 316, 319

[56] References Cited

U.S. PATENT DOCUMENTS

| | | | |
|---|---|---|---|
| 2,525,695 | 10/1950 | Lombard | 403/316 X |
| 3,194,615 | 7/1965 | Weasler | 464/172 X |
| 3,344,618 | 10/1967 | Young | 464/172 X |
| 4,364,689 | 12/1982 | Dumortier | 403/353 X |
| 4,747,804 | 5/1988 | Benzi | 464/172 X |

FOREIGN PATENT DOCUMENTS

| | | |
|---|---|---|
| 2218501 | 2/1974 | France . |
| 2334877 | 9/1976 | France . |
| 2507266 | 6/1982 | France . |
| 2550833 | 2/1985 | France . |
| 3208541 | 6/1983 | Germany . |
| 8906325 | 7/1989 | WIPO . |

Primary Examiner—Daniel P. Stodola
Assistant Examiner—Emmanuel M. Marcelo
Attorney, Agent, or Firm—Evenson, McKeown, Edwards & Lenahan, P.L.L.C

[57] ABSTRACT

Coupling shaft for transmitting a torque from the power take-off shaft of a tractor to the input shaft of a driven agricultural machine, which shaft is provided with at least one universal joint, wherein the shaft is protected by a tube of fitting material which is mounted on the shaft by a bearing ring which protrudes into a groove of the shaft and is connected to a cover which is fixed to the tube and which projects over the universal joint, wherein the bearing ring is provided with at least two cam-like protrusions arranged along the periphery of the ring at a mutual distance and the cover is provided with at least two spaces in each case for receiving these protrusions, wherein by an angular displacement of the bearing ring relative to the cover a locking in axial sense is effected between cover and bearing ring, and wherein an insert piece is active between cover and bearing ring to counter an opposite rotation of this bearing ring such that assembly can take place without tools, but disassembly takes place with tools.

8 Claims, 7 Drawing Sheets

COUPLING SHAFT HAVING A PROTECTIVE COVER WITH A LOCKING MEMBER

BACKGROUND AND SUMMARY OF THE INVENTION

The invention relates to a coupling shaft for transmitting a torque from the power take-off of a driving machine, for instance an agricultural tractor, to the input shaft of a driven machine, for instance an agricultural machine, which shaft is provided with at least one universal joint, such as a cross connection, wherein the shaft is protected by a tube of fitting material which is mounted on the shaft by means of a bearing ring which protrudes into a groove of the shaft and is connected to a cover which is fixed to the tube and which projects over the universal joint.

The above stated coupling shafts normally lie free between the driving and driven machine so that for safety purposes it is necessary to arrange a protective tube therearound which is stationary. This is difficult on account of the bearing mounting. The relatively dangerous universal joints are guarded by a cover projecting thereover.

The assembly of such protective constructions round the drive shaft are quite complicated even though many proposals for simplification have already been made.

The invention has for its object to provide a very simple-assembly for performing without auxiliary tools and having comparatively few separate components, while retaining a durable operation under heavy conditions, wherein for safety reasons disassembly is not possible other than with use of tools, so that undesired disengagement is impossible.

The coupling shaft according to the invention is distinguished in that the bearing ring is provided with at least two cam-like protrusions arranged along the periphery of the ring at a mutual distance and the cover is provided with at least two spaces in each case for receiving these protrusions, wherein by an angular displacement of the bearing ring relative to the cover a locking in axial sense is effected between cover and bearing ring, and wherein a closely-sized locking member is active between cover and bearing ring to counter an opposite rotation of this bearing ring.

Due to the closely-sized locking member, by which is meant that this is received closely-sized in the cover, it is possible to determine immediately that the assembly operations have been carried out correctly and that the cover is properly positioned in relation to the bearing ring.

According to a further development the locking member is formed by an insert piece which can be locked into a recess of the cover and which is provided with a passage opening for lubrication purposes. A dual function is herewith created in simple manner for the insert piece, which serves, on the one hand, to secure the correct position of the bearing ring in the cover and, on the other, to feed fats or oils to the bearing ring close to the shaft rotating therein.

Moreover, due to the isolation of the lubrication function in a separate insert piece, the manufacture of the cover is considerably simplified. The insert piece can further be embodied as standard component which can be applied in covers of different dimensions.

In another embodiment the locking member is a ring which is connected rotatably and slidably to the cover and which is at least provided with two or more axially directed locking lips which lock the protrusions into the recesses of the cover in the correct position. This bearing ring can also be provided with a passage for the lubricant.

BRIEF DESCRIPTION OF THE DRAWINGS

Above mentioned and other features will be further elucidated in the figure description hereinbelow of a number of embodiments. In the drawing.

DETAILED DESCRIPTION OF THE DRAWINGS

Figure 1:
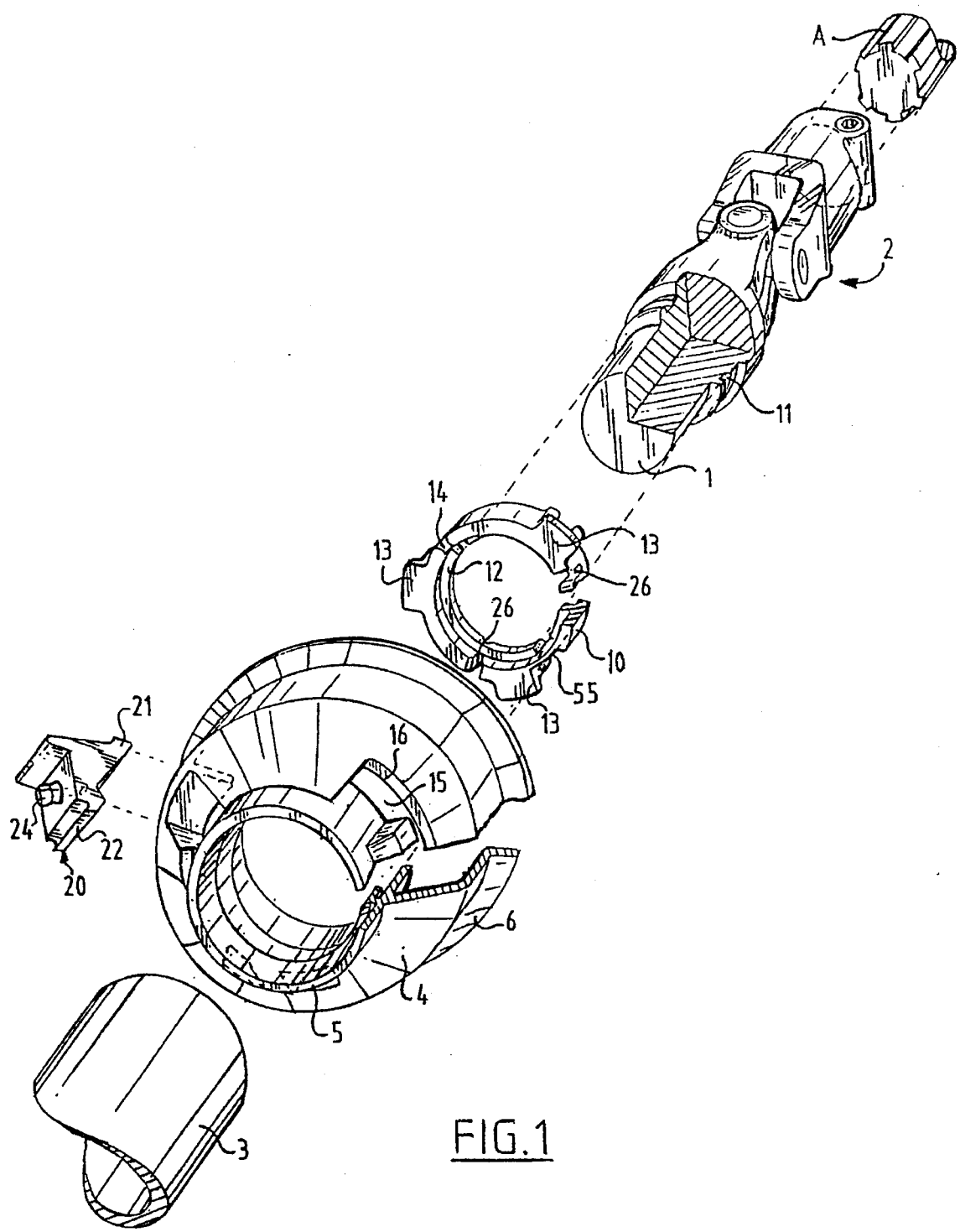
FIG. 1 shows a perspective view with exploded parts of the coupling shaft according to the invention.

Designated in the figures with the numeral 1 is the drive shaft, only a part of which is shown in FIG. 1. The drive shaft has a random length and only the part coupled to the universal joint 2 is shown in FIG. 1. The universal joint can be coupled to the power take-off shaft respectively the input shaft of the driving or driven machine.

The protective construction around shaft 1 is formed by a tube 3 of preferably plastic material, a cover 4 connecting thereon, the neck 5 of which can be pushed over the tube 3 and fastened thereto by a random fastening method to form one whole. The cover has a dimension such that in the assembled situation the collar 6 lies fully round universal joint 2, which collar widens such that shaft 1 and power take-off shaft A can form a mutual angle during the rotating movement.

It is usual for the protective tube 3 with cover 4 to remain stationary during rotation of the shaft 1, this being realized by means not further shown, which standstill however requires a bearing mounting relative to shaft 1. For this purpose a bearing ring 10 is fixed in the manner to be further elucidated hereinafter in the cover 4 and received in a groove-like path 11 of shaft 1. The ring 10 is provided on the inner periphery with a protruding rib 12 which fits into the groove 11. The ring is further provided with a number of outward pointing or radially oriented cams 13, of which there are three in the embodiment shown, which are distributed uniformly over the periphery so that an angle of 120° is enclosed therebetween.

For assembly purposes the ring is embodied with a radial breach 14, wherein diametrically opposite this breach a thinned or narrowed portion 55 is arranged in the body of the ring 10. For assembly the half ring parts extending between the breach 14 and the narrowed portion 55 can be pulled outward, wherein the narrowed portion 55 functions as hinge. The ring halves can then be placed round the thickened portion of shaft 1 with the groove 11, whereafter the spine or rib 12 can enter the groove 11 during closing of the ring halves.

The cover 4 is embodied with spaces 15, of which there are also three in the embodiment shown, and which are also distributed equally over the periphery so that an angle of 120° is also enclosed therebetween. This corresponds with the number of cams 13 on ring 10. The space 15 opens radially outward via a recess 16 in the cover, wherein the edge of recess 16 functions as stop surface for cam 13, which can be seen in cross section in FIG. 2.

The assembly of the cover 4 onto the ring 10 is therefore effected by sliding the cams 13 into the recesses 16 of the cover and rotating them through a determined angle so that the cams 13 come to lie behind edge 16.

According to the invention a locking member 20 is also arranged. This locking member serves to prevent the undesired opposite rotation of bearing ring 10 relative to cover 4.

Figure 2:
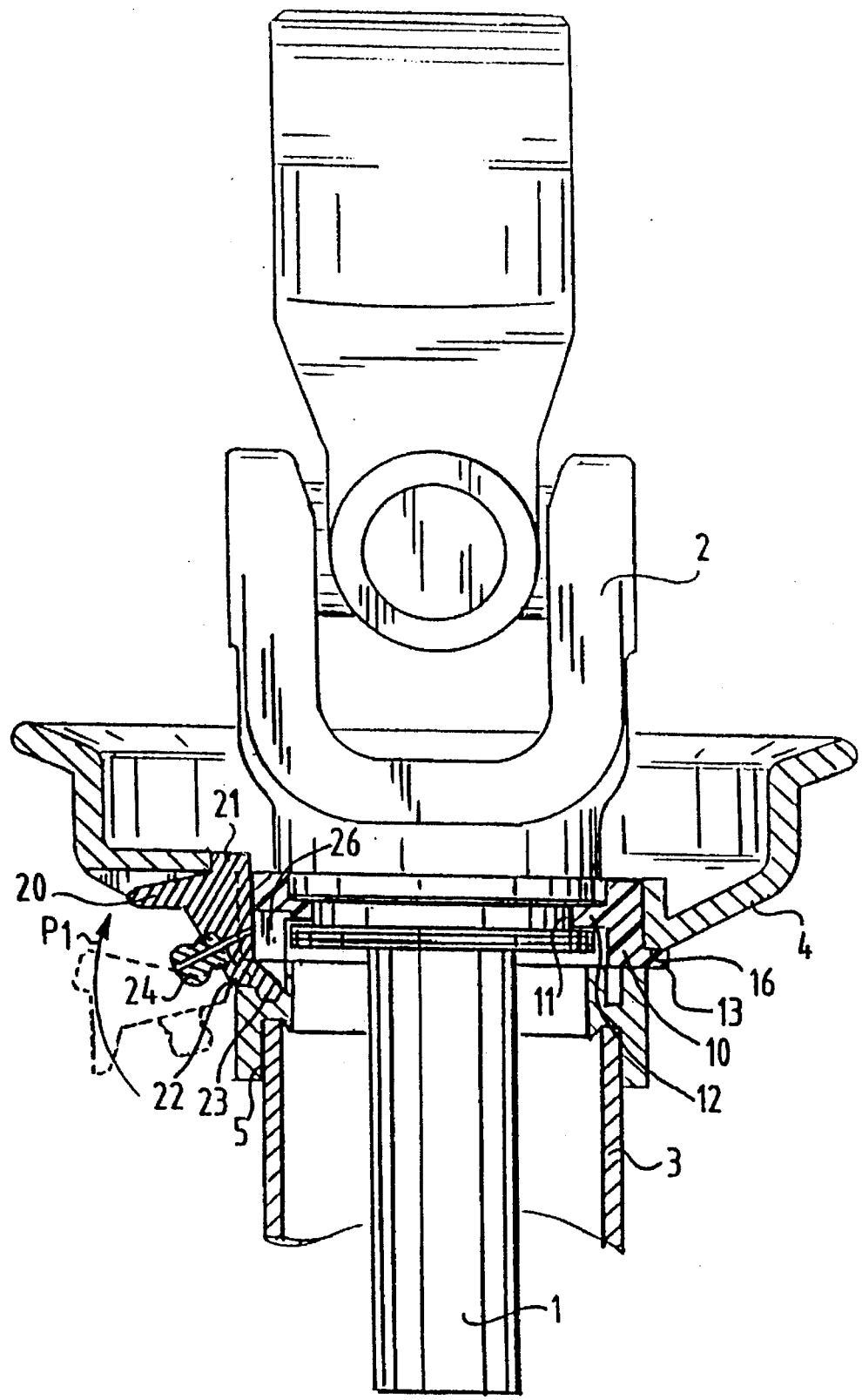
FIG. 2 shows an axial section of the assembled coupling shaft with a first embodiment of the locking member.

The locking member 20 according to FIG. 1 and 2 is embodied as an insert piece which fits closely-sized into recess 16 on the outside of cover 4. The insert piece here takes a solid form and is provided on the one side with a nose 21 which hooks on the inside rim of the edge 16 of recess 15 after the lip 22, of the insert piece 20 is first arranged behind a stop edge 23 of the neck 5 of the cover. This is shown in FIG. 2, wherein the prefitting position is shown with dashed lines, the fitting direction of the insert piece is shown with arrow P1 and the fitted position is shown in full lines.

It is noted that the insert piece is also provided with a lubricating nipple 24, the passage of which is in direct communication with the space inside the cover and debouches into a lubrication passage of bearing ring 10. Lubricant can hereby be delivered via lubricating nipple 24 to the groove 11 in shaft 1. It is further noted that three openings 26 are arranged in the bearing ring 10, all to the side of cams 13, so that assembly of the ring 10 relative to the cover 4 can take place in three positions without detracting from the locking respectively lubricating action of the insert piece.

It is herein further remarked that one of the three openings 26 is formed by the breach 14.

The locking of the above mentioned insert piece can only be effected when the material of cover 4 is sufficiently flexible to give at 16 in order to be able to hook behind the nose 21 of the insert piece.

Figure 3:
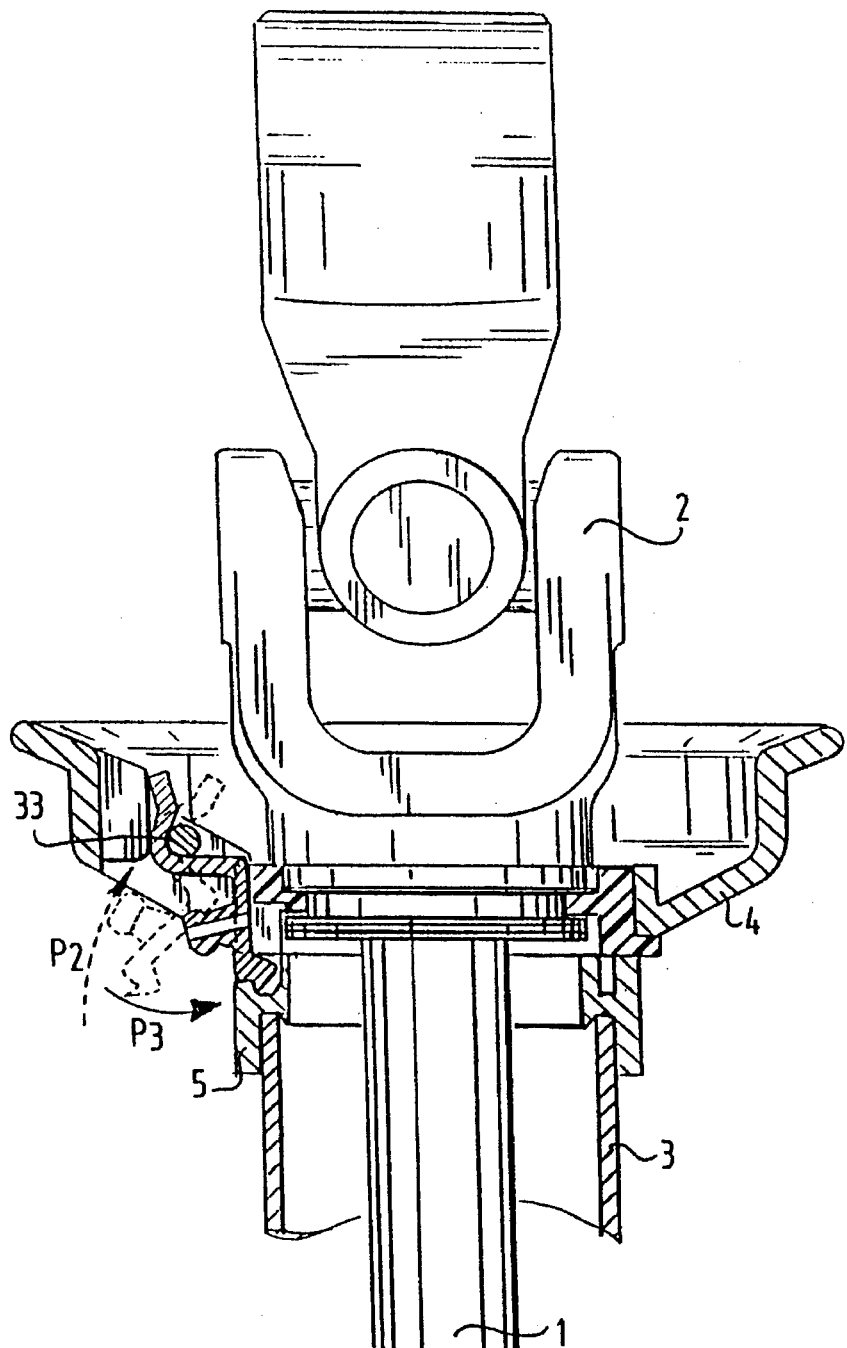
FIG. 3 and 4 show an axial section corresponding with FIG. 2 of a second embodiment of the locking member, respectively a perspective view thereof.
Figure 4:
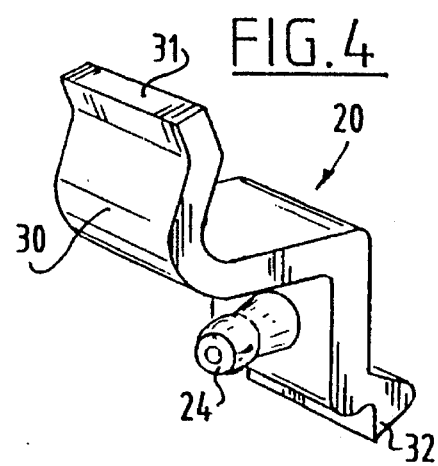

In the embodiment according to FIG. 3 and 4 the insert piece is embodied as a profiled strip 30 with an insert lip 31 and a counter-nose 32. This insert piece 20 is also provided with a lubricating nipple 24. Assembly takes place using a pin 33 integrated into the cover 4 at a distance from the outer wall of cover 4. Assembly of the insert piece 20 takes place by introducing the lip 31 between the pin 33 and the wall of the cover as according to arrow P2 and by then turning the lip in the direction of arrow P3 and pressing the nose 32 out of the position in dashed lines to the position drawn in full lines behind the edge 5 of the cover. The flexibility for the snap connection here comes from the insert piece 20 itself. The action of the lubricating nipple 24 is the same as that of the foregoing embodiment.

Figure 5:
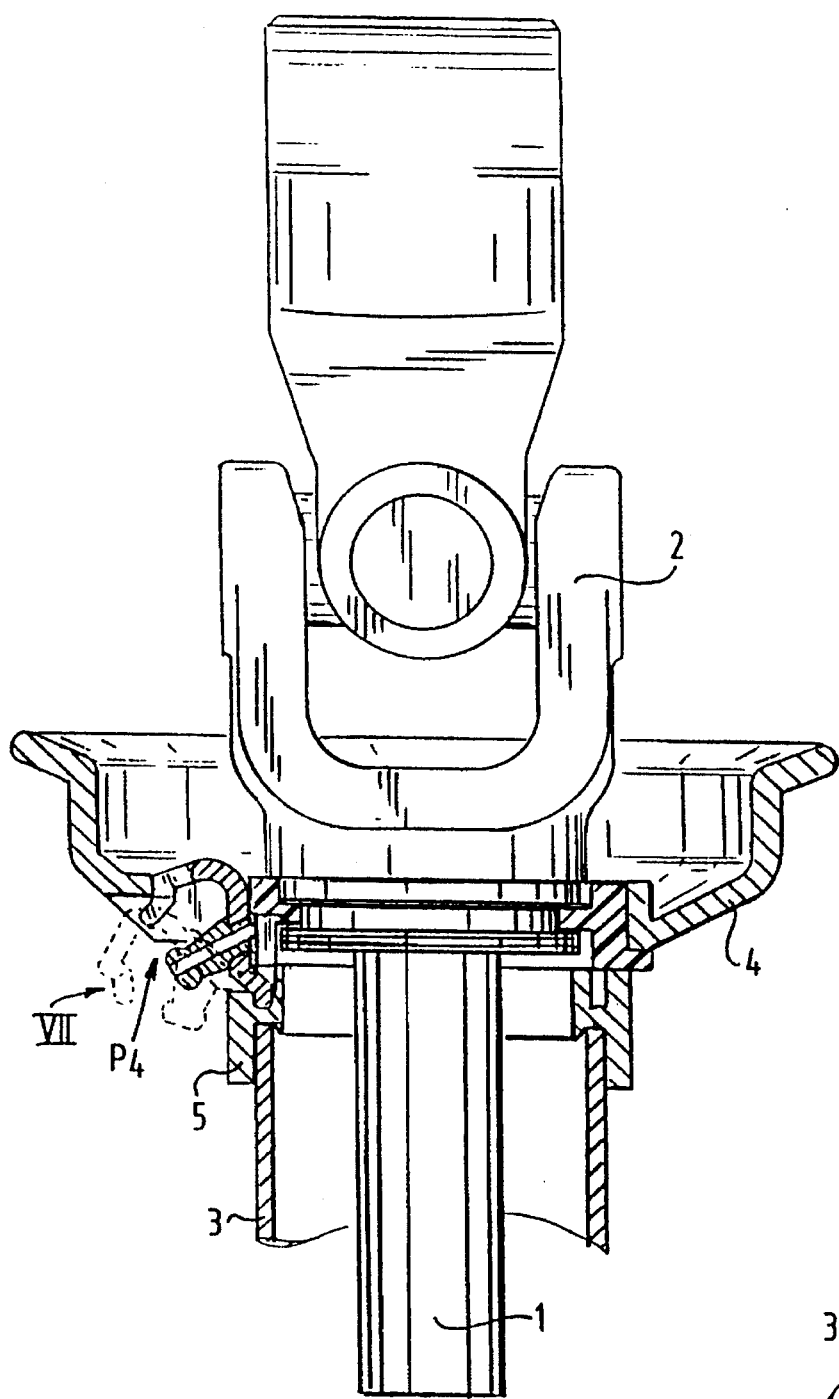
FIG. 5, 6 and 7 show an axial section corresponding with that of FIG. 2 of the coupling shaft provided with a third embodiment of the locking member, respectively a perspective view of the locking member, respectively a perspective view in the assembled situation thereof.
Figure 6:
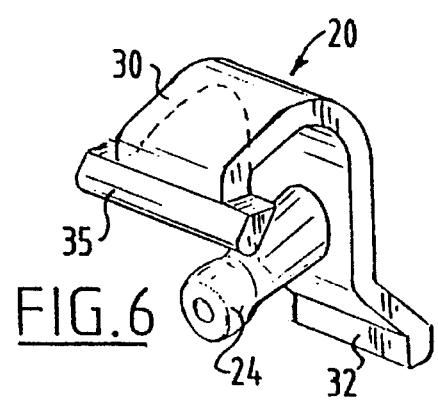

Yet another embodiment is shown in FIG. 5 and 6. The insert piece 20 is here also embodied as a strip 30 which is provided on the one side with a nose 32 and a stop 35 which is broader than the width of the strip 30.

Figure 7:
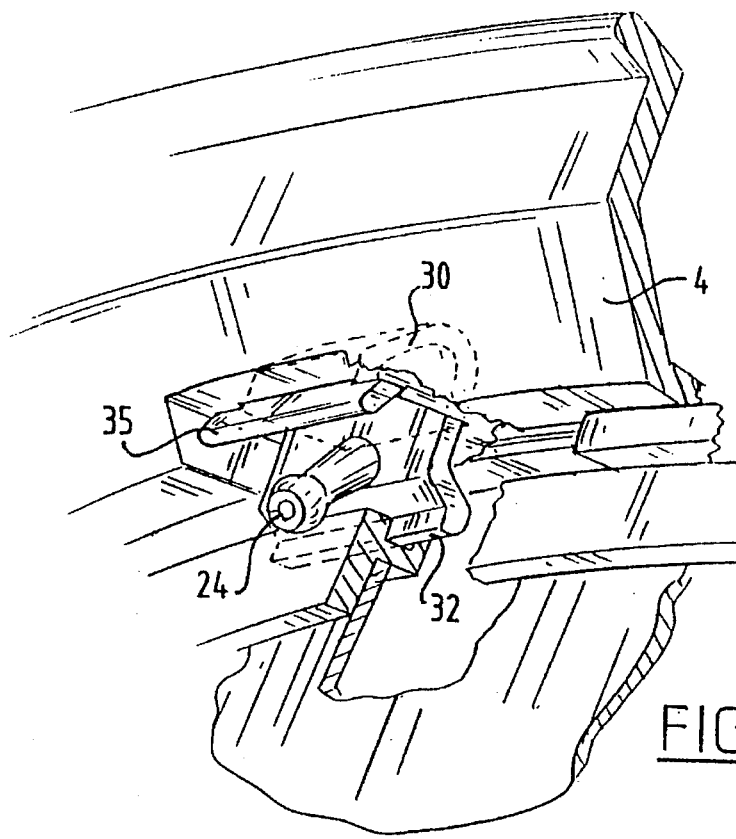

Assembly takes place by placing the nose 32 behind the edge of the neck 5 of cover 4 and by subsequently pressing inward in the direction of arrow P4 so that the stop 35 comes to lie against the outside of cover 4. Here the flexibility comes from the strip material so that a close-fitting snap connection results in order to lock insert piece 20 into cover 4. The stop 35 herein remains accessible from outside, whereby an easy disassembly is achieved. By pressing on stop 35 in the direction of the lubricating nipple 24, the strip 30 can be bent inward sufficiently so that it can be pivoted outward again round the nose 32, see FIG. 7.

Figure 8:
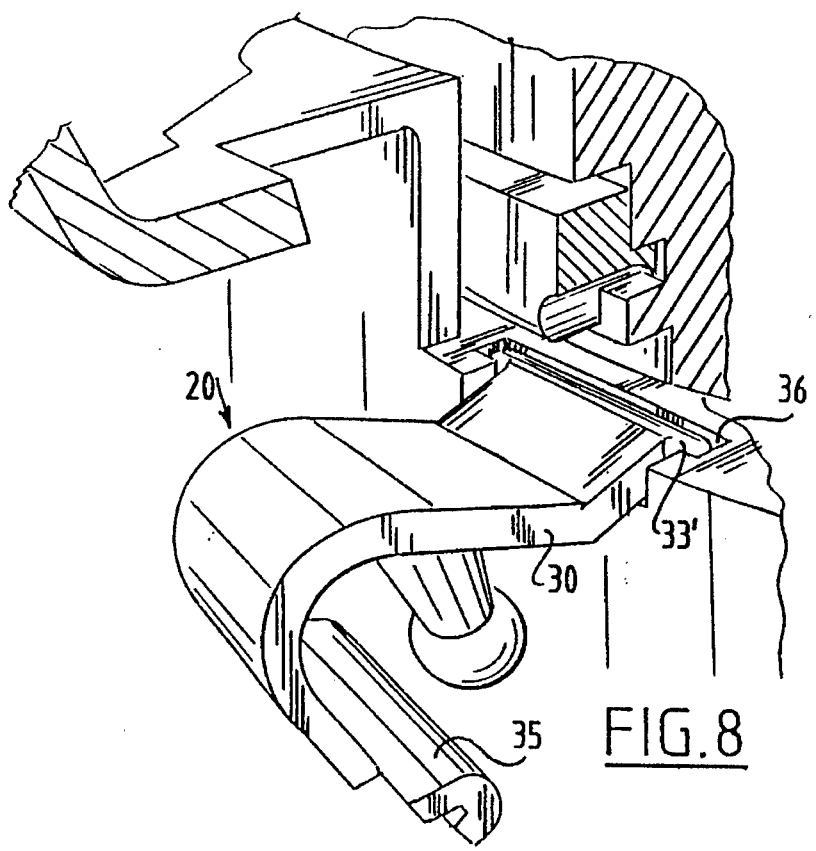
FIG. 8 is a perspective view, partly in section, of a variant of the second embodiment of the locking member.

FIG. 8 shows a variant of insert piece 20, which is a combination of the embodiment according to FIG. 3 and 5. Moulded onto the end of the insert piece is a pin 33' around which the strip material 30 can swivel. The other end is likewise provided with a stop 35 which is broader than the strip itself. Pin 33' is placed in a slot 36 of cover 4 which has a breadth dimension such that pin 33' snaps therein. This fastening enables the insert piece to remain suspended in an "intermediate assembly position" in the cover (FIG. 8). This has the advantage during disassembly that it does not drop out of cover 4, with the danger of loss.

An additional resulting advantage is that the assembly in the factory can be split into an operation which can be performed manually ("placing" of the insert piece) and an operation wherein tools can be used ("snapping into place" of the insert piece).

Figure 9:
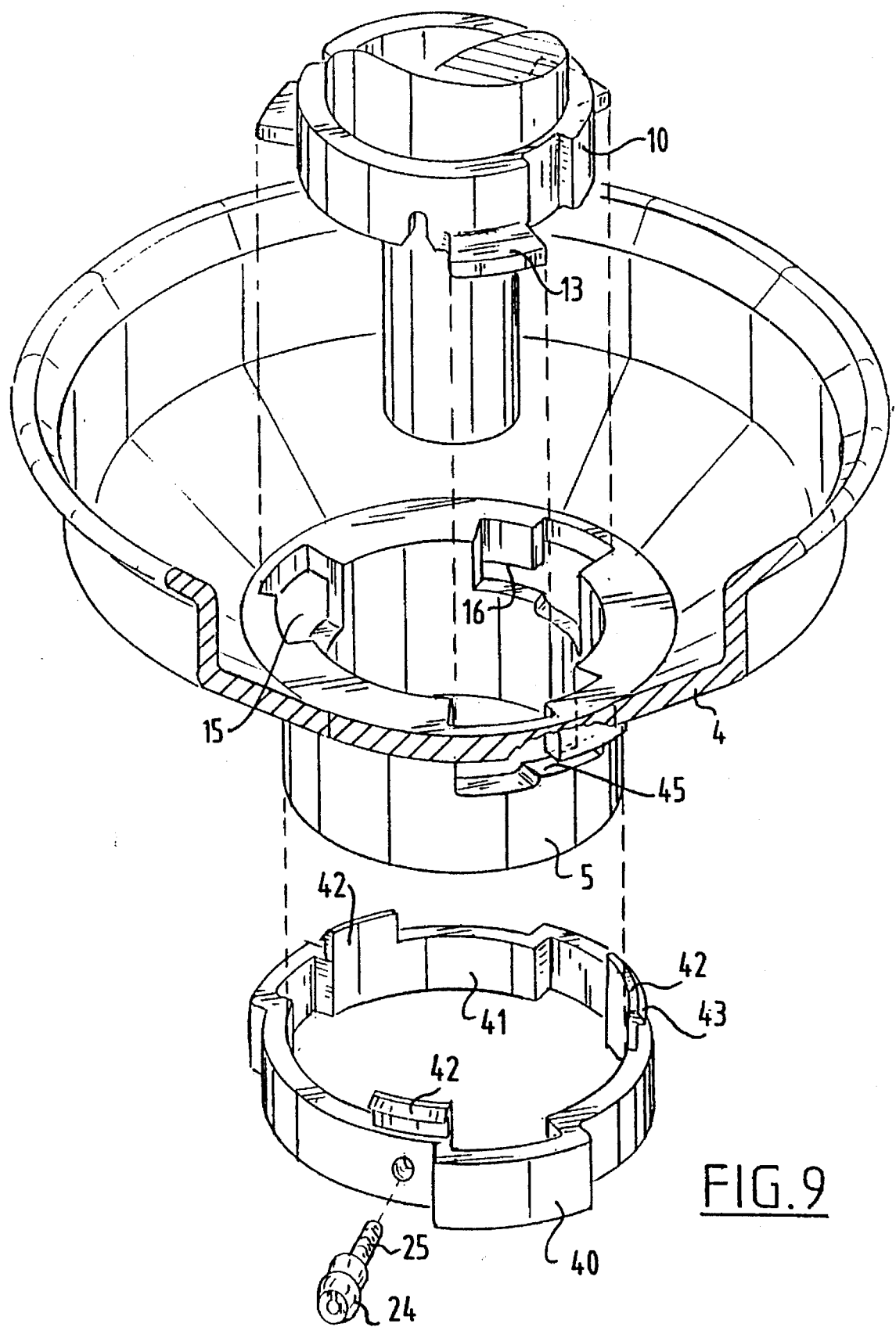
FIG. 9, 10 and 11 show a perspective view of the coupling shaft with exploded parts, wherein the locking member is embodied as ring, respectively a perspective detailed view of the second stage of assembly, respectively a second perspective detailed view in the locking position of the ring after assembly.
Figure 10:
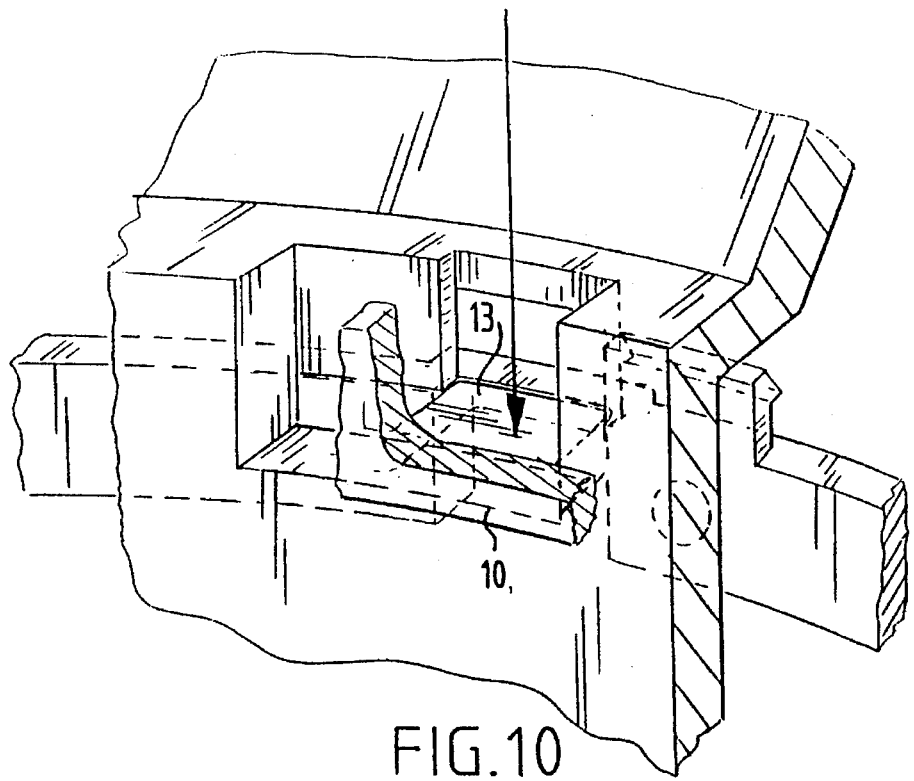
Figure 11:
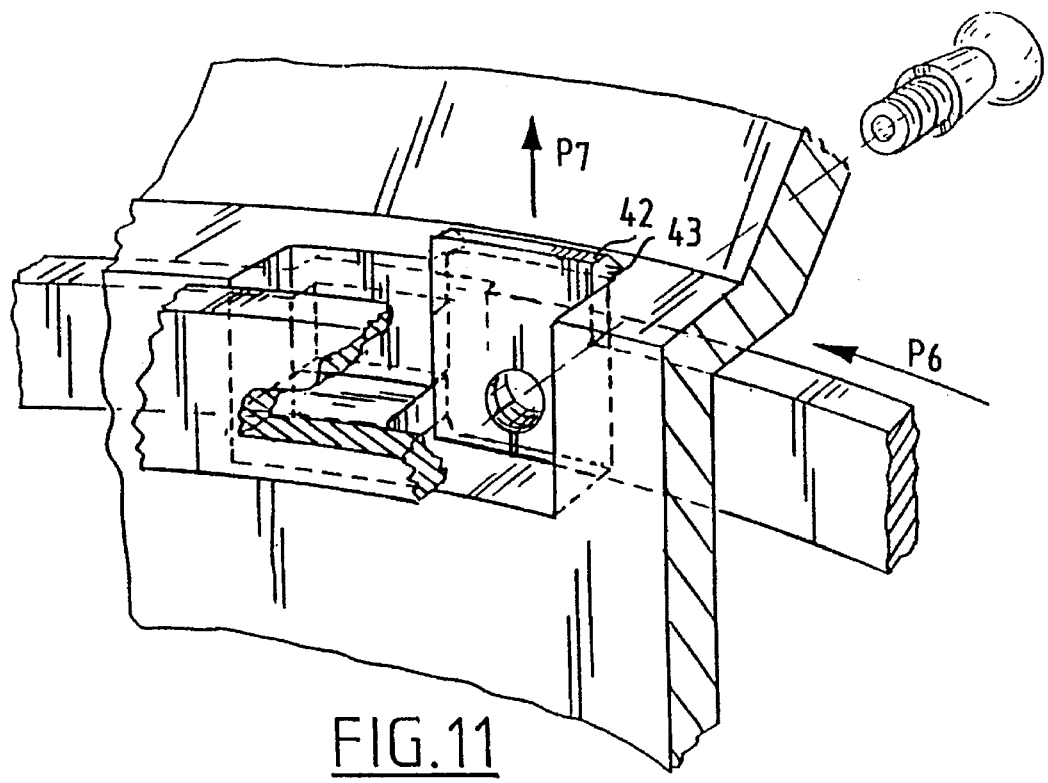

FIG. 9, 10 and 11 show an embodiment of the locking member in the form of a ring 40 which has a corrugated appearance but the narrowest inner periphery 41 of which connects onto the outer periphery of the neck 5 of cover 4.

The cover 4 is embodied in the manner described above with openings 15 for passage of cams 13 of bearing ring 10. By rotating the cams they come to lie behind the edge 16 of cover 4, whereby an axial locking of ring 10 relative to cover 4 is effected. The locking takes place with the lips 42 which are arranged axially on the ring 40 and three of which are shown, corresponding with the recesses 16 in cover 4. The lips 42 have a hook-like end 43 which faces outward. The locking ring 40 is rotated over the neck 5 of cover 4 until lips 42 come to protrude in the opening 15 of the cover against the cams 13 of bearing ring 10, see FIG. 10. By further rotating according to arrow P6 in FIG. 11, wherein the cams 13 are carried along to the correct position, after sliding in the direction of arrow P7, i.e. axially over the neck 5, the lips 42 can be locked with hook-like ends 43 behind the cover.

It is noted that the ring likewise has a lubricating nipple 24 with a shank length 25 such that, when arranging the nipple 24 which can protrude into a recess 45 in the neck of the cover, a coupling is effected between ring 40 and neck 5 while retaining the possibility of sliding and rotation of the ring in relation to the cover.

The invention is not limited to the above described embodiments.

I claim:

1. Coupling shaft for transmitting a torque from a power take-off shaft of a driving machine to an input shaft of a driven machine, which shaft is provided with at least one universal joint, wherein the shaft is protected by a tube of fitting material which is mounted on the shaft by means of a bearing ring which protrudes into a groove of the shaft and is connected to a cover which is detachably fixed to the tube and which projects over the universal joint, wherein the bearing ring is provided with at least two cam-like protrusions arranged along the periphery of the ring at a mutual distance and the cover is provided with at least two open spaces extending through the cover in each case for receiving the cam-like protrusions in a non-stressed manner, wherein by an angular displacement of the bearing ring relative to the cover, a locking in an axial sense is effected between the cover and the bearing ring, and wherein a separate locking member is arranged so as to be closely-sized in at least one of the at least two spaces between the cover and the bearing ring to counter an opposite rotation of the bearing ring and to indicate a proper positioning between the bearing ring and the cover.

2. Coupling shaft as claimed in claim 1, wherein the locking member is formed by an insert piece which is locked into a recess of the cover and which is provided with a lubrication passage opening.

3. Coupling shaft as claimed in claim 2, wherein locking of the insert piece is effected with a snap connection.

4. Coupling shaft as claimed in claim 2, wherein the insert piece is a profiled strip provided with a locking lip.

5. Coupling shaft as claimed in claim 1, wherein the locking member is a ring which is connected rotatably and slidably to the cover and which has at least two axially directed locking lips.

6. Coupling shaft as claimed, in claim 1, wherein the bearing ring has at least one radial breach with a narrowed portion at a distance therefrom.

7. Coupling shaft as claimed in claim 1 claims, wherein the bearing ring has a radially directed passage for feed of a lubricant.

8. Coupling shaft as claimed in claim 7, wherein the radially directed lubricant feed passage is arranged in each case adjacently of a locking lip of the bearing ring.

* * * * *